United States Patent

[11] 3,603,881

[72] Inventor William E. Thornton
Santa Monica, Calif.

[21] Appl. No. 709,569
[22] Filed Mar. 1, 1968
[45] Patented Sept. 7, 1971
[73] Assignee Del Mar Engineering Laboratories
Los Angeles, Calif.

[54] FREQUENCY SHIFT TELEMETRY SYSTEM WITH BOTH RADIO AND WIRE TRANSMISSION PATHS
3 Claims, 11 Drawing Figs.

[52] U.S. Cl. .......... 325/30,
128/2.06, 128/2.1, 325/118, 340/189, 340/206
[51] Int. Cl. .......... A61b 5/04
[50] Field of Search .......... 128/2.05, 2.06, 2.08, 2.1, 2.15, 2.1 A; 340/310, 183, 184, 189, 206; 325/30, 38, 39, 40, 118

[56] References Cited

UNITED STATES PATENTS

| | | | |
|---|---|---|---|
| 3,210,747 | 10/1965 | Clynes | 128/2.1 X |
| 3,234,543 | 2/1966 | Thompson et al. | 340/310 X |
| 3,373,405 | 3/1968 | Gadbois | 340/183 X |
| 3,435,358 | 3/1969 | Rheinfelder | 340/310 X |

FOREIGN PATENTS

| | | | |
|---|---|---|---|
| 718,131 | 11/1954 | Great Britain | 128/2.15 |

OTHER REFERENCES

Geddes, " American Journal of Medical Electronics" Jan.-Mar. 1962, pp. 62- 69 (copy in 128-2.15)

*Primary Examiner*—William E. Kamm
*Attorney*—Smyth, Roston & Pavitt

ABSTRACT: A transmission system using a possibly existing wiring system for transmitting RF signals and covering short distances away from the wiring system through VHF transmission. In hospitals, physiological data are transmitted from a sensor VHF transmitter to a fixed VHF receiver RF transmitter coupled to the wiring system in the building. A RF receiver demodulator monitor is coupled to wiring system at the nurses' station. The system is particularly designed for noise suppression.

INVENTOR:
William E. Thornton
By Angel, Easton & Pravitt
ATTORNEYS

INVENTOR:
William E. Thornton

By Smyth, Roston & Pavitt
ATTORNEYS

FREQUENCY SHIFT TELEMETRY SYSTEM WITH BOTH RADIO AND WIRE TRANSMISSION PATHS

The invention relates to a new transmission system and is primarily provided for cooperation with an already existing wiring system provided for other purposes, such as the power line wiring, an intercom system, a nurse call system, or the like. The invention has been conceived on basis of and as a solution of a specific problem, but lends itself to broader applications. Nevertheless, it is convenient to describe the invention in relation to the specific problem sought to be solved.

A patient in a hospital is usually confined to a room, primarily because his condition requires such confinement, and often for reasons of permitting extensive observation of him. For critical cases, these observations have to be made frequently. The mortality can be markedly reduced in certain classes of patients, such as coronary occlusions, by continuous observation of physiological parameters. In other patients, not necessarily seriously ill, definitive diagnoses may be made by continuous or frequent observation which allows definitive documentation of transitory phenomena. If the patient is observed directly at his bedside, the observing nurse has only limited possibilities for summoning help if such is required; for each critical patient one observer is required, which is impractical, as continuous attention does not necessarily mean undivided attention, but there is no other choice if the patient is observed directly in his room.

The system, in accordance with the present invention permits continuous observation of a plurality of patients, enabling the observer to keep them all under surveillance and to summon help more easily when needed. A central observation station may be the nurses' station, which is really the central point for organizing and directing the care of all patients. Several such stations are usually provided only for reasons of size of the hospital or to provide more readily and speedily specialized care to accommodate different types of conditions requiring different treatment. However, additional observation stations may be distributed at strategic locations, enabling, for example, the doctor or doctors in charge, even while moving about in the hospital building, to personally check on the patients.

From a superficial point of view, the most simple system could involve straightforward telemetry, with the sensing part of measuring instruments attached to the patients and wires running from the instruments to the nurses' station where the indicating part of the instruments are located. Such a system is exceedingly impractical as it requires a complete set of wires running from each hospital room to the nurses' station. Moreover, the patient could be in direct electrical contact with the transmission system which is, per se, undesirable for numerous reasons. Moreover, such a system would require the patient to be actually in bed and to be more or less immobilized therein. This would limit the system for use in cases of intensive care patients actually confined to their beds. Finally, such special wiring system could be very expensive. In lieu of the wiring system, one could use radio telemetry. However, this is impractical due to the relatively large power requirement for the transmitter, to be worn or carried by the patient.

The system, in accordance with the invention, is designed to lend itself to a variety of uses and the continuous, remote, possibly centralized observation of more or less immobilized patients is one of them. In accordance with the preferred embodiment of the invention, a small, low power, light weight VHF transmitter is attached to a patient. The transmitter has an information input established, for example, by electrodes attached to the patient to measure electrical potential differences at different skin locations indicative of electrocardiac signals. The transmitter provides short-range transmission of a VHF signal modulated by a subcarrier which, in turn, is modulated by the information signal, such as the physiological signal to be transmitted. Short range is intended to mean presently to cover a distance comparable with the dimensions of the room in which the carrier of the transmitter is expected to be. A broader definition will be given below.

In the same room, there is a VHF receiver and signal converter which receives the transmitted signal and provides a signal of lower, RF frequency but modulated with the same information, particularly the same information modulated subcarrier as modulated on the received VHF signal. The receiver-converter is, furthermore, provided with a coupler, for coupling the RF frequency signal to an existing wiring system of the hospital building. This may be the 110v. power line running through the walls of the building. Hence, the coupler serves as transmitter for the RF signal to obtain transmission of the RF signal through this wire system. While nothing precludes the installation of a wiring system just for purposes of the transmission of signals as presently described, it is a principal aspect of the invention that an existing wiring system can be used. Since often hospitals have a particular wiring for an intercom system, that can readily be used.

The transmitted RF signal must have frequency below the limit frequency for the wiring system, which is expected not to comprise coaxial cables. The limit frequency is about 2 mc., provided there is no transformer in the wiring system, i.e., transmission is restricted to that part of the wiring system which is directly (galvanically) interconnected. The RF signal is received in the central station, for example, the nurses' station demodulated and preferably fed to a display monitor. If the physiological data is an electrocardiac signal, the monitor could be an oscilloscope or an oscillograph. Additionally, or in lieu thereof, the data may be stored on tape, for example, for online computer analysis. One can see that employment of the system is not limited to continuous, centralized observation, but the transmitted data can be recorded, additionally or in lieu of display. Hence, the system can be used where a long term observation of a patient is needed in order to gain extensive data which do not require concurrent evaluation by an observer, and permitting the patient to move about.

Different patients will use different transmission frequencies, particularly as far as the RF transmission through the wiring system is concerned. The VHF frequencies employed for the transmitters of different patients need to be different only to the extent of avoiding possible interference. Signals transmitted in remotely located rooms are less likely to interfere with each other, even if having similar frequencies.

The term "short range" for the VHF transmitter should be defined now more broadly. The principle medium of signal transmission is the wiring system which may be extensive, but is stationary. The VHF receiver RF transmitter assigned for cooperation with a (potentially) mobile VHF transmitter is connected to the wiring system at a fixed location. The mobile VHF transmitter must have a transmission range sufficient to reach the affixed receiver-transmitter, but the range should be shorter than the distance to the ultimate receiver. This is an operating condition to limit the VHF transmission range so that the power level is below the limit in accordance with FCC requirements concerning unlicensed transmission in the VHF range.

The auxiliary wiring system used is expected to extend beyond the range of permissible coverage by the VHF transmitters. Moreover, as the system is expected to be used in buildings, but the VHF transmitter needs to overcome the shielding effect of wall structure to a limited extent only, if at all. Hence, for transmission in a building, the VHF transmission range will be that of the size of a room. A transmitter range of 35 feet to 50 feet radius will be typical. Broadcasting in a normal room readily meets the FCC restrictions. If the VHF transmitter is moved out of range, another or several other receiver-transmitters coupled to the wiring system is to be used to readily enlarge the actual range coverage by a single, mobile VHF transmitter itself having a short range as defined.

It can readily be seen that the system finds utility for cases of telemetry where an existing wiring system can be used for transmission. There is no other permanent installation required. The VHF receiver RF transmitter when coupled to the mains can be a plug-in unit, and the mobile VHF transmitter is attached to whatever is to be observed. This may be test animals, machines, particularly all those kinds of objects which should not be linked directly by wires to a wiring system for any reason. In either case, the system can be installed and changed in accordance with temporary requirements.

The system could be operated also for transmission of information in the reverse direction. The information signal is transmitted as RF and subcarrier modulated signal through the wiring system as aforedescribed. At a desired location that signal is received and converted into a VHF-subcarrier modulated signal and transmitted over a short range to a mobile VHF receiver. The mobile VHF receiver demodulates the information and controls utilization thereof. This then includes the possibility that the initial VHF transmitter and final VHF receiver are mobile units coupled to each other through an RF transmission path using an existing wiring system as described. The mobile receiver may then drive a portable monitor.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

Figure 1:
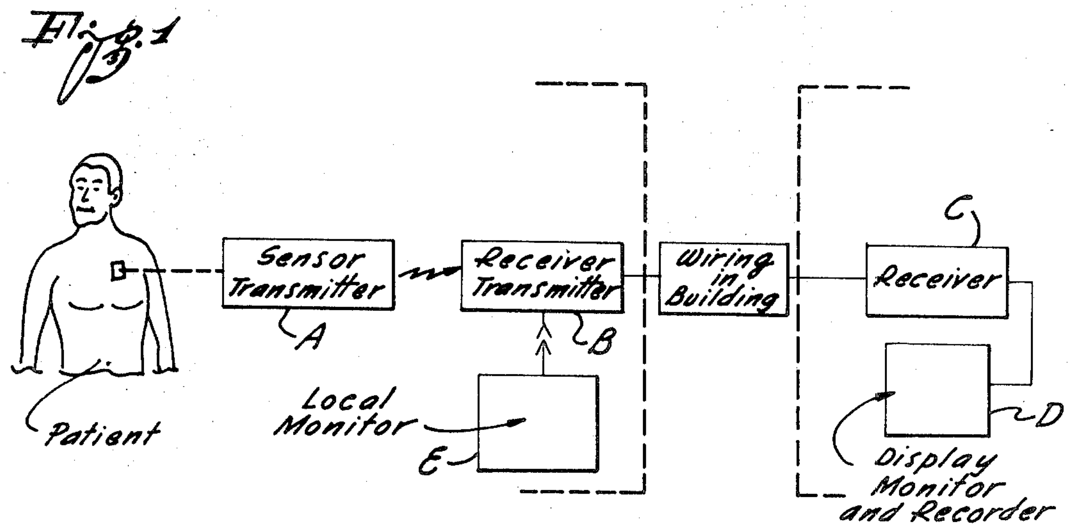
FIG. 1 illustrates schematically the layout of a single transmission channel in accordance with the preferred embodiment for a system of the present invention.
Figure 2:
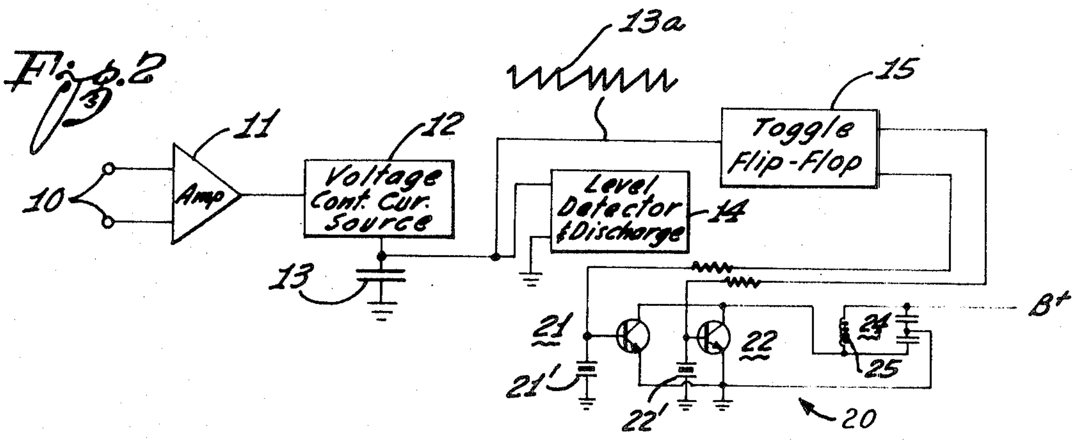
FIG. 2 illustrates somewhat schematically and as a block diagram, a VHF transmitter with incorporated data source, as one compound of the present invention and as illustrated in FIG. 1.
Figures 3, 4, 4A:
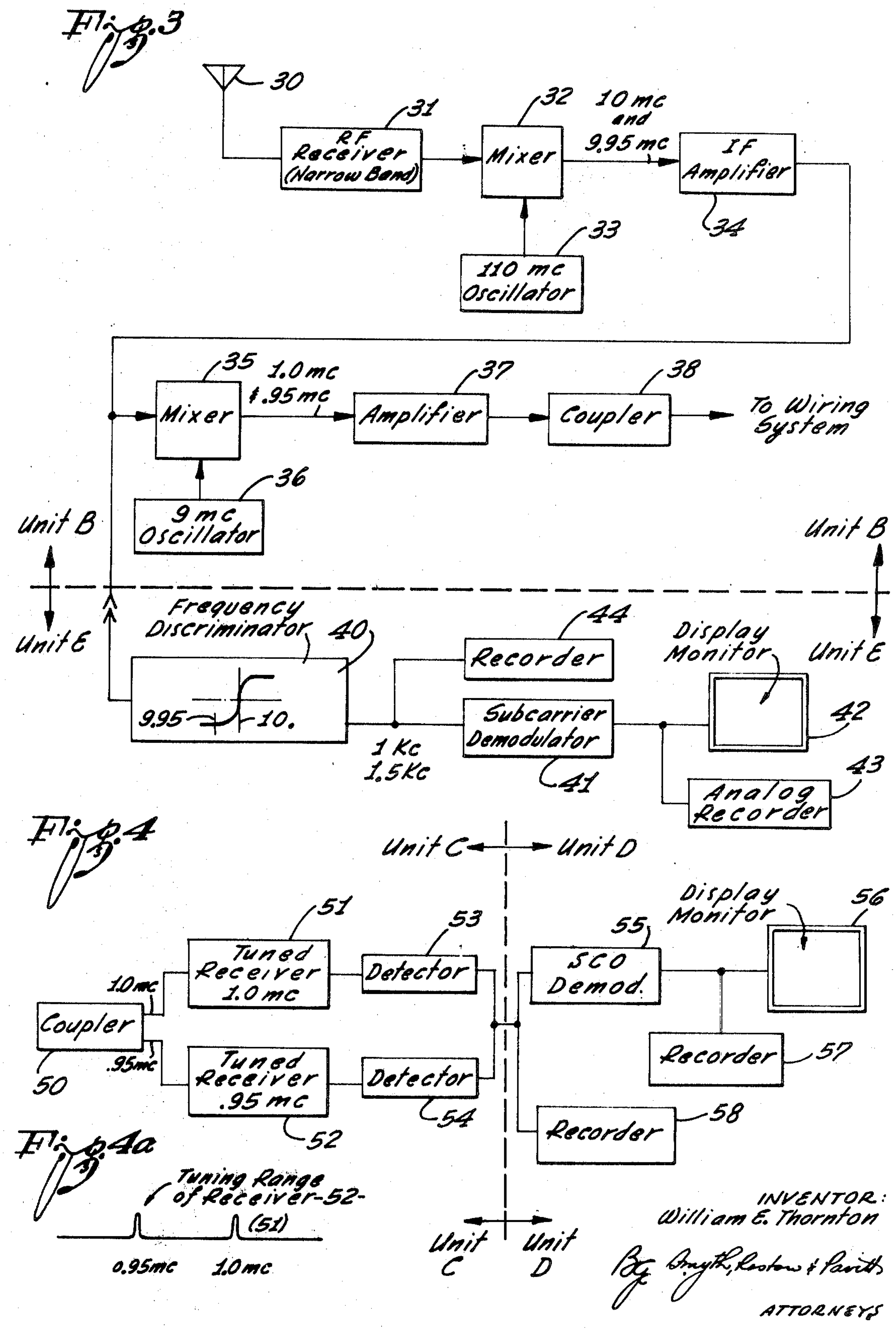

FIGS. 2*a* to 2*f* illustrate wave forms of signals as developed in the circuit shown in FIG. 2;

FIG. 3 illustrates a block diagram for a VHF-receiver RF transmitter supplemented by a local monitor for the system shown in FIG. 1;

FIG. 4 illustrates a block diagram for a RF receiver with monitor for the system shown in FIG 1; and FIG. 4*a* illustrates a diagram for a waveform of receivers proper in the unit shown in FIG. 4.

The principal units comprising the system in accordance with preferred embodiments of the present invention are shown schematically in FIG. 1. Unit A is a sensor-transmitter or data receiver-transmitter carried by and/or attached to a patient for measuring relevant physiological data. The unit senses, for example, electrocardiac voltages and transmits a very high frequency signal which is modulated by the measuring signal at a very low power so as to cover a very short range only. Representatively, the transmitter range is about equal to the normal size of a hospital room. The transmitter in unit A includes its own power supply such as a battery. Due to the low power requirements of the unit the battery needs to be replaced only very infrequently, such as after several months or the like, even if used continuously. The principal characteristics of the unit A is that it combines a sensor with a mobile, short-range VHF transmitter expected to be used in a confined area.

Unit B is a VHF receiver RF transmitter; it receives the short-range VHF signals from a transmitter A and converts them into a modulated, radio frequency signal. The unit B is a stationary device coupled to any wiring system passing through a wall or walls or in the vicinity of a wall or walls of the room in which a carrier of a unit A is expected to be found. Unit B transmits to the wiring system the radio frequency signal resulting from the conversion.

Unit C is centrally located and coupled to the same wiring system to which one or several of the units B are coupled for receiving the signals sent by unit B into the wiring system. There is at least one unit C per each unit A employed in the system. Unit C demodulates the radio frequency signal it receives to restore the information which originated in unit A; particularly unit C provides signals representative of the signals sensed by the sensor of unit A. Unit C may then provide for display and/or record these data.

In a typical example of employment of the system, one or several of the Units A are being worn by different patients in ore or several hospital rooms, for example, intensive care units. Each of these rooms is equipped with one of the units B. One or several units C are installed in a nurses' station to provide signals to a monitor unit D. Each patient is thus assigned a particular transmitter channel comprised of units A-B-C-D. The several monitors D, one for each patient, include, for example, a display monitor such as an oscilloscope for keeping the heart activity of the patient under continuous observation. Other physiological data are indicated accordingly. The monitor D may include recording equipment. For further supplementing the monitoring system, unit B may be connected to a display monitor and/or recording device E to permit observation, for example, of the electrocardiac signals directly in the room of the patient. Unit E may be disconnectable from the system at will.

FIG. 2 illustrates a representative example for unit A. Electrodes 10 are attached to the chest of a patient at suitable places exhibiting potential differences representative of electrocardiac signals. This voltage is the information signal to be transmitted. The information signal has generally a low frequency. The baseband of the electrocardiac signals is about 0.1 c.p.s. to 100 c.p.s. A low frequency signal amplifier 11 receives the output signal of electrodes 10 and provides signals at a more suitable level. The output voltage of amplifier 11 controls the impedance of a current source 12 for increasing or decreasing the flow of current to a capacitor 13. A level detector and discharge unit 14 is connected across the capacitor. Whenever the voltage across capacitor 13 has reached a particular level it is discharged, to be charged anew from the current source 12 until the particular voltage has been reached, etc. The nongrounded electrode of capacitor 13, therefore, provides a sawtooth wave, illustrated representatively in FIG. 2*a*.

The sawtooth wave has a variable slope due to the control extended by amplifier 11 upon current source 12. The amplitude of the sawtooth wave is constant and determined by level detector 14. Thus, the controlled slope variations result in a variable frequency signal. Therefore, the output as cooperatively provided by elements 12, 13 and 14 is a frequency modulated signal. The frequency band of this signal is determined by the operating characteristics of the elements 12, 13 and 14 for the expected modulation of the baseband signal as provided by the electrodes 10 and amplifier 11.

Figures 2A, 2B, 2C, 2D, 2E, 2F:
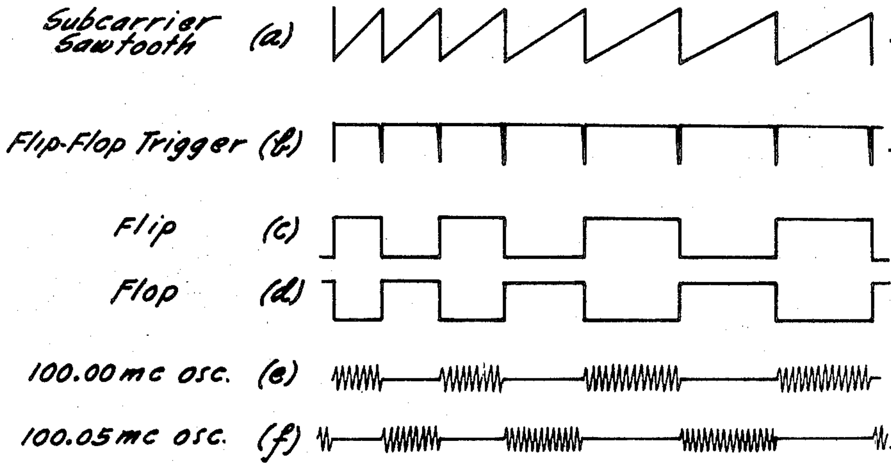

The signal train as shown in FIG. 2*a*, preferably the fast retrace of each wave, triggers a toggle flip-flop 15. Fig. 2*b* shows the corresponding trigger pulses. Flip-flop 15 provides a pulse-pause train of rectangularly shaped pulses and which is frequency modulated in accordance with the baseband information signal. The frequency modulation appears as variable period square wave provided by flip-flop 15. Representatively, the output signal of toggle flip-flop 15 may have a center frequency of 1.5 kc. at a modulation of ±50 percent or more. This large percentage of modulation provides noise reduction and reduces the performance required from magnetic tape recorders. FIG. 2*c* illustrates the corresponding signal train derivable from the set-side output of flip-flop 15, and FIG. 2*d* is the complementary train derivable from the reset side output. The output signal of toggle flip-flop 15 constitutes a baseband frequency modulated subcarrier within the system; this subcarrier band will remain the same throughout the transmission process, and the same band is used for all of the different units A employed for different patients.

The elements of unit A as described thus far serve primarily for the preparation of an information signal suitable for further electrical processing. For this purpose, unit A includes a VHF transmitter 20 which comprises a first VHF oscillator 21 and a second VHF oscillator 22. Oscillator 21 may, for example, be a crystal oscillator accurately tuned to 100 mc. Oscillator 22 will also be a crystal oscillator, tuned to 100.05 mc. Using crystal oscillators permits readily stable frequency separation as between the two oscillators; particularly the 50 kc. frequency difference can be maintained throughout further processing.

The set side output of toggle flip-flop 15 turns oscillator 21 on and off, dependent upon the "true" or "false" state of that flip-flop output. The reset side output of flip-flop 15 turns oscillator 22 on and off analogously, whereby it is apparent that oscillators 21 and 22 are alternatingly turned on and off, with one, but only one being turned on at a time. Thus, the oscillators pass signals in alternating sequence as determined by the baseband modulated subcarrier to an antenna coil 25 for short-range transmission. The elements 21, 22 and 25 establishing transmitter 20 have been explained in terms of functional separation. However, the oscillators can be structurally combined in that they share elements, such as the LC-circuit 24. Thus the oscillators are interconnected to have a common feedback circuit in Colpitts configuration. The coil 25 of the LC-circuit 24 serves as antenna; crystals 21′ and 22′ are in the base circuits of two gated transistor amplifiers with common emitter and common collector circuits. The B+ voltage is derived from the same battery which powers amplifier 11, current source 12, detector 14 and flip-flop 15.

FIG. 2*e* illustrates the effective output of oscillator 21 as controlled from flip-flop 15 through the wave train depicted in FIG. 2*c*, while FIG. 2*f* illustrates the effective output of oscillator 22. Antenna 25 broadcasts the algebraic additions of the two wave trains. The transmitted signal thus alternates at the baseband modulated subcarrier rate between 100 mc. and 100.05 mc. As the subcarrier is 1.5 kc., the bandwidth for each of these transmitted signals is very narrow. A different pair of transmitter frequencies is used for each each patient in order to avoid crosstalk. However, where two rooms are fairly far apart, fairly well shielded, with no danger that the respective patients may leave their rooms, the same frequency pair can be used. The transmitter frequencies are chosen to be outside of the band of any VHF station, the signal of which could have comparable strength in the room. This presents no difficulties as due to the narrow bandwidth of the transmitter signals they can be placed in between the bands of two VHF stations.

The subcarrier signals as modulating in complementary format the two oscillator signals provides this modulating control as sequence of rectangularly shaped switching pulses, alternatingly coupling the oscillators to the antenna at the subcarrier rate. Hence, the transmitted signal has a broader band than established by the subcarrier, which, however, is inconsequential for the system. On the other hand, the duplication of transmitting the subcarrier pulse-pause train by means of two carrier frequencies establishes a very beneficial signal-to-noise ratio of the entire system.

FIG. 3 illustrates unit B. It includes an antenna 30 connected to an RF receiver 31 having a bandwidth sufficient to receive the 100 mc. and 100.05 mc. signals. RF receiver 31 can be a narrow band receiver in that the receiver band needs to include only these two frequencies. The receiver output signal is fed to a mixer 32 receiving, in addition, the signals from an oscillator 33. The oscillator 33 is also a crystal oscillator providing signals at a frequency, for example of 110 mc. The sum-of-the-frequencies signals as provided by the mixer 32 are disregarded. The difference-of-the-frequencies signals have respectively frequencies of 10 mc. and 9.95 mc., alternating at the subcarrier frequency. The intermediate frequency signal is amplified by an IF amplifier 34 and fed to a second mixer 35, receiving also the output signal of an oscillator 36. Element 36 may also be a crystal oscillator and provides, for example, a 9 mc. signal. The difference-of-the-frequencies as provided by mixer 35 respectively 1.0 mc. and 0.95 mc. and they also alternate at the baseband modulated subcarrier frequency.

It must now be considered that actually several units B are provided. One in each transmission channel, each transmission channel transmitting different data. Each unit B has such oscillators 33 and 36, each has mixers 32 and 35. The frequencies of oscillators 33 and 36 are chosen, so that the output signals of the several mixers 35 (as pertaining to different units B) are in a band between 2 mc. and 0.1 mc. The output signals should be below 2 mc. as signals of higher frequency cannot be transmitted through a regular wiring system without material radiation loss and attenuation within short distances. Of course, coaxial cable could be used, but the purpose of the system is to use existing wiring facilities such as the regular power line so that special cables are not required.

The lower limit frequency of the band within which output signals of the mixers 35 should be is determined by the band width of these output signals themselves and the required separation for obtaining suitable signal to noise ratios. The band width (i.e., the difference in frequencies of the two output frequencies of a mixer 35) is 50 kc., and 25 kc. separation is desirable between the output signals of different mixers 35 (as pertaining to different units B). Therefore, a suitable system operating band of 1.5 mc. is adequate for accommodating twenty different transmission channels A-B-C, thus including twenty units B, each having a different signal band as far as the output of its respective mixer 35 is concerned.

On the other hand, the output frequencies of mixers 32 can be 10 and 9.95 mc. for all units B of the system. These signals are not transmitted, and if unit B is properly shielded, different units B placed at different locations will not interfere with each other. One will choose similar IF frequencies, for example, 10 and 9.95 mc., because implementation of the system is more economical if the IF amplifier 34 (and other elements of unit B not yet described) can be similar in design and adjustment for all units B.

The output of mixer 35 is amplified by an amplifier 37 and passed through a coupler 38 to a wire system which runs through the hospital. As stated, this could be the regular 60 cps power line or it could be an intercom wiring system, or any other type of cable which happens to run through the building; coupler 38 may be a capacitive coupler, providing low impedance signal transmission to the wiring system. The remainder of the unit B will be described below.

FIG. 4 illustrates the unit C which, as was mentioned above, is one of several centrally located RF receiver units all being of the same type but tuned to different RF frequencies. Unit C has an input coupler 50 connected to same wiring system to which coupler 38 is connected. Following the numerical example chosen below, coupler 50 receives the 0.95 to 1.0 mc. signals as provided by the unit B as described. A first, narrowly tuned amplifier 51 receives the signal and responds particularly to the 1 mc. signal only. Moreover, tuning is provided particularly to the exclusion of the 0.95 mc. signal, (and, of course, to the exclusion of other signals fed by other units B into the wiring system serving as transmission medium).

A second receiver 52 is tuned to 0.95 mc., also at a narrow range for particularly excluding 1 mc. Narrow tuning of the two receivers eliminates also subcarrier harmonics and, therefore, noise. The tuning ranges are depicted in FIG. 4*a*. The tuned receivers 51 and 52, respectively, feed subcarrier detectors 53 and 54 which provide complementary output signals at the subcarrier rate. These signals are both a replica of the pulse train provided by toggle flip-flop 15 (FIG. 2). The redundancy inherent in the providing of two tuned receivers and detectors is greatly beneficial for noise suppression.

The outputs of the detectors 53 and 54 are inversely combined and form a low noise signal train which is the baseband modulated, recovered subcarrier signal. That common output signal is demodulated in a subcarrier demodulator 55 and the resulting baseband, information signal can be displayed in an oscilloscope 56 for continuous supervision. Additionally or alternatively, the output of the demodulator 55 can be recorded in an analog recorder 57 or, if preferred, the subcarrier signal can be recorded in a high frequency recorder 58.

Turning now back to FIG. 3, the receiver transmitter unit B, which is provided in a room, i.e., in the vicinity of the patient, can be connected, in addition, with local monitoring and/or recording equipment E. For this purpose, the IF amplifier output circuit is provided with a second branch which includes, first, a frequency discriminator 40. Frequency discriminator 40 has, for example, a center frequency of 10 mc., providing zero output, if the signal it receives has a frequency of 10 mc. Discriminator 40 provides a particular, maximum output when the signal received is 9.95 mc. The output is, therefore, the recovered subcarrier signal, i.e., the output of the frequency discriminator 40 is a replica of the pulse train provided by toggle flip-flop 15. A subcarrier demodulator 51 removes the subcarrier frequency and provides the baseband signal to a monitor, such as an oscilloscope 42. In addition, or in the alternative, the baseband signal is fed to an analog recorder 43. The subcarrier signal may, in the alternative, be recorded in a high frequency recorder 44.

Inasmuch as the IF frequency is the same for all units B, frequency discriminator 40 has likewise the same operating range for all units B. Thus, the assembly 40-41-42 (and/or 43, and/or 44) can be a single, mobile monitoring (and/or recording) unit, provided for selective placement into the room where needed, and further provided for selective plug-in connection to the local unit B.

The invention is not limited to the embodiments described above but all changes and modifications thereof not constituting departures from the spirit and scope of the invention are intended to be covered by the following claims.

I claim:

1. A system for transmission of information using a wiring system, comprising:

a first and second oscillator each providing high frequency signals of slightly differing frequencies;

first means defining a source of data and providing data signals to be transmitted, the signals having characteristics of a pulse-pause train;

second means connected to the oscillators for transmitting the high frequency signals and including means for connecting the oscillators to the source for obtaining short-range wireless transmission of the high frequency signals of the two oscillators in alternating sequence in accordance with the pulse-pause train;

third means positioned for receiving the high frequency signals as transmitted by the second means and providing a signal train in which two frequencies alternate in accordance with said pulse-pause train, the latter two frequencies being below a limit frequency for signal transmission through the wiring system;

fourth means coupling the signal train to the wiring system for transmission therethrough; and fifth means coupled to the wiring system and being responsive to the signals of the train for providing a duplicate signal of said pulse-pause train.

2. A system as set forth in claim 1, the fifth means including a pair of narrow band tuned receivers coupled to the wiring system and respectively responsive to the two frequencies as provided by the third means.

3. A system as set forth in claim 1 wherein first means including a. means for providing information signals, and b. means coupled to the (a) means to provide a subcarrier modulated by the information signals and as a pulse-pause train.